Patented Feb. 14, 1933

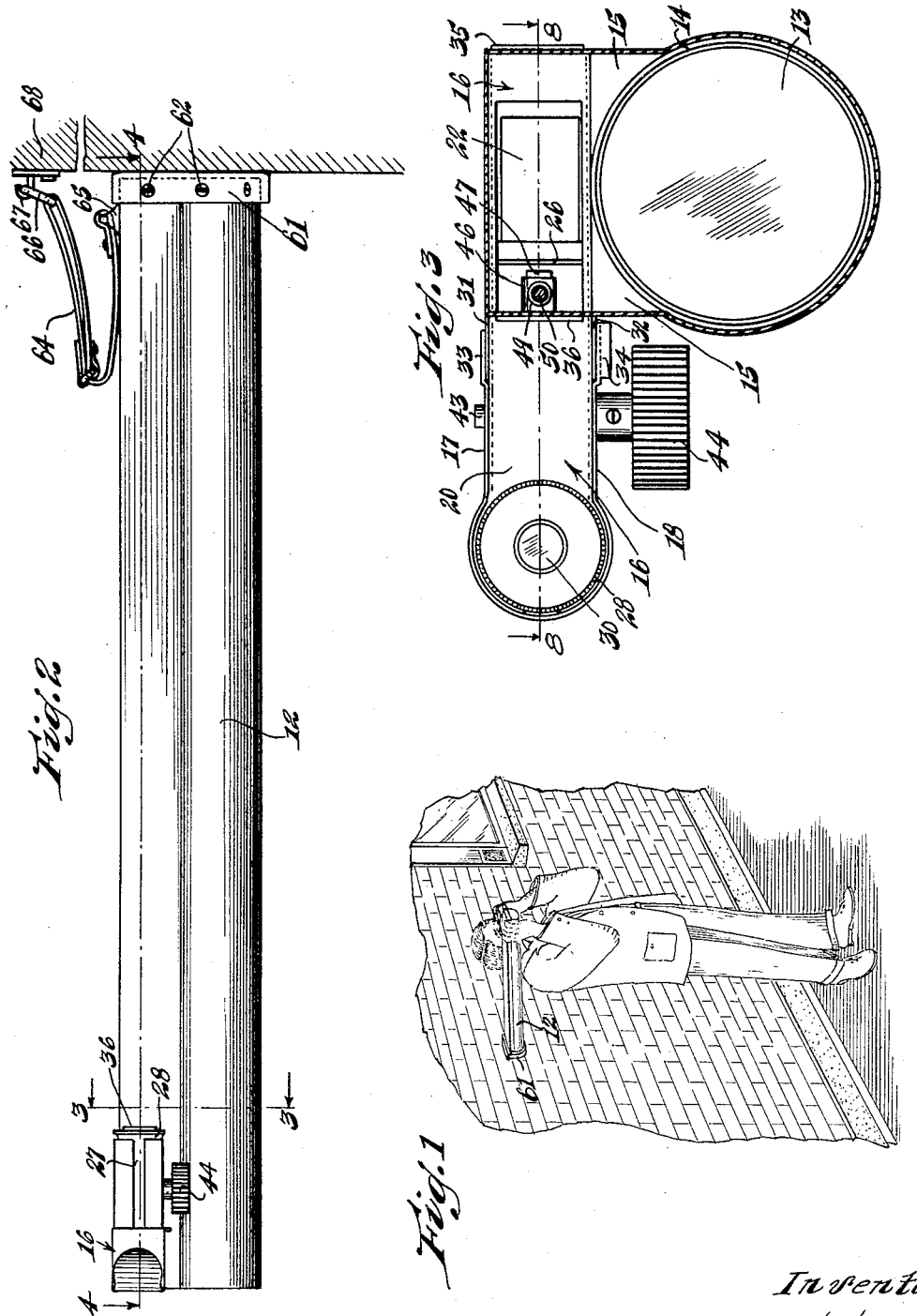

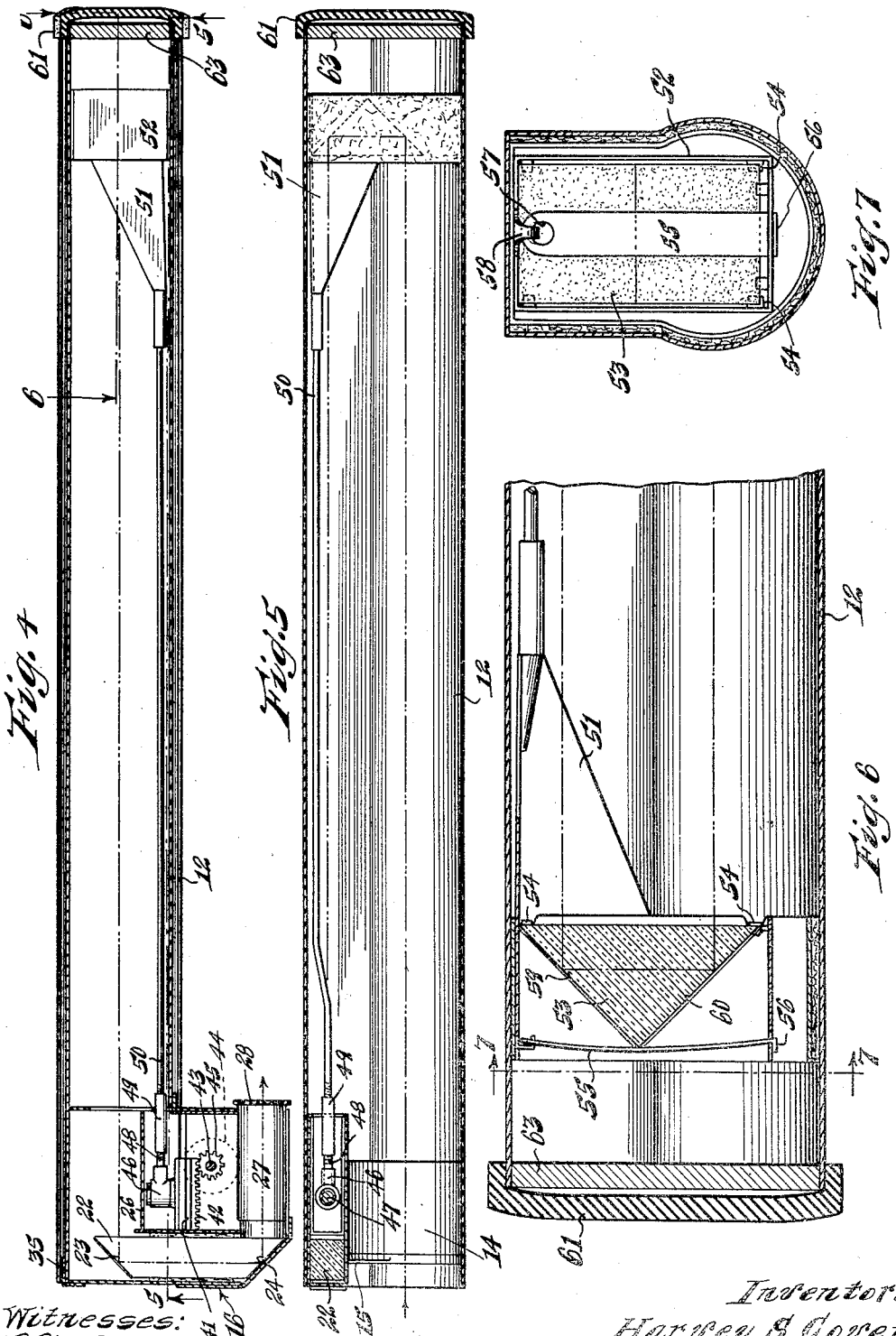

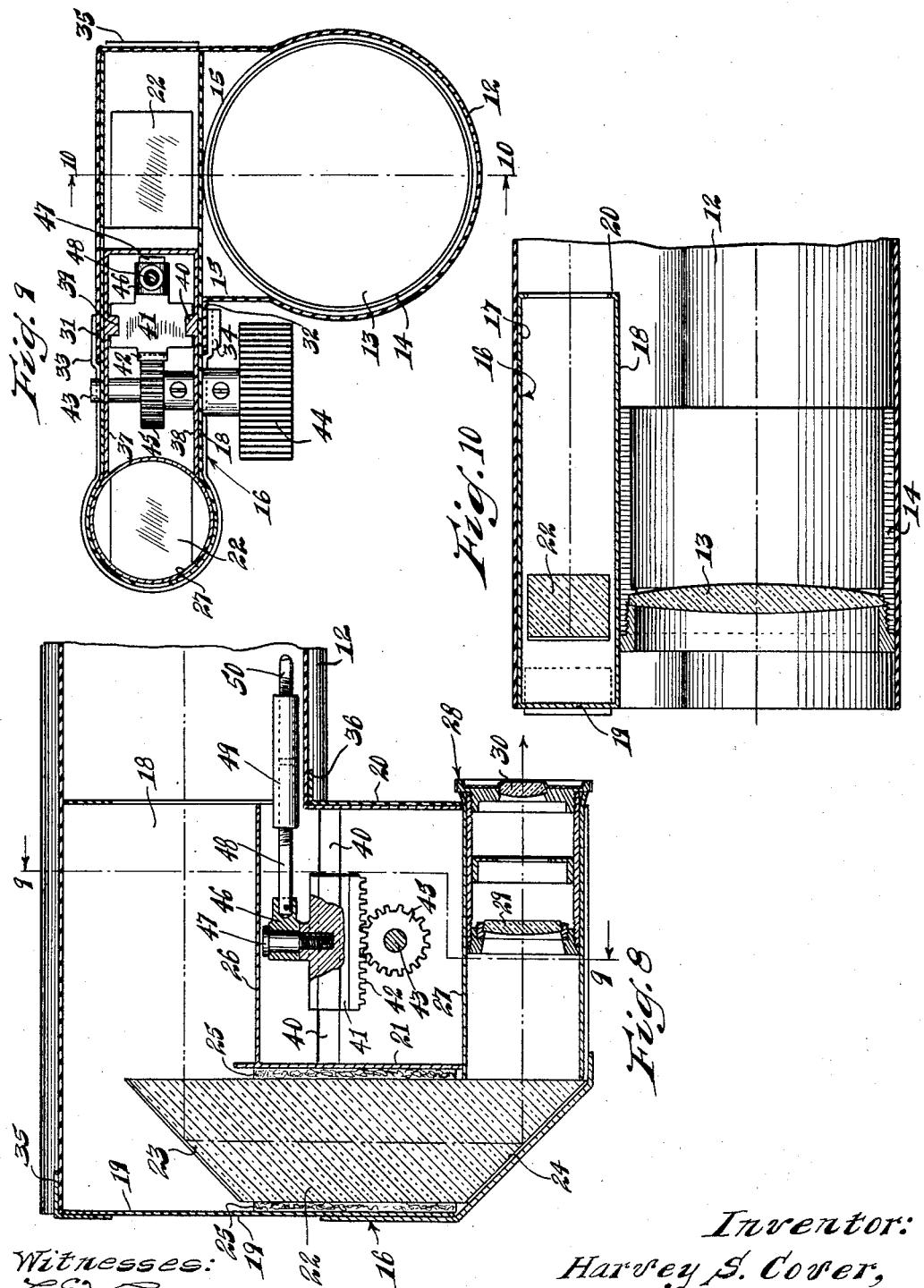

1,897,608

UNITED STATES PATENT OFFICE

HARVEY S. COVER, OF SOUTH BEND, INDIANA

PRISM TELESCOPE

Application filed May 15, 1930. Serial No. 452,718.

This invention relates to a prism telescope, and an object of the invention is the provision of an improved telescope employing reflecting prisms for the purpose of conserving space and changing the direction of the light rays. An additional object resides in the provision of an improved prism telescope wherein the objective and ocular lenses are positioned in substantially close proximity to each other, and after entering the objective lens the light rays are carried to a total reflecting prism positioned a substantial distance to the rear of both the ocular and objective lenses and then reflected forwardly to a second total reflecting prism for reflection through the ocular lens. As a further object, the invention embodies an instrument of relatively great focal length, and especially designed so that in use the rear extremity of the instrument may be supported against any rigid structure to reduce vibration and dispense with the use of a tripod, as is necessary in the high power telescopes positioned entirely in advance of the eyes. An additional object resides in the provision of an instrument of the character indicated, simple and durable in construction, light in weight so as to be readily handled and transported, and composed of a relatively few number of parts so mounted that the instrument may be readily dissembled for cleaning or adjustment by the average user.

Other objects will appear hereinafter.

The invention consists in the combinations and arrangements of parts hereinafter described and claimed.

The invention will be best understood by reference to the accompanying drawings forming a part of this specification, and in which:

Fig. 1 is a perspective view of one manner of supporting the instrument in use by lightly pressing the rear end of the instrument against a building wall;

Fig. 2 is an enlarged side elevational view of the device in operative position and provided with a supporting member;

Fig. 3 is an enlarged cross-sectional view taken substantially on the line 3—3 of Fig. 2;

Fig. 4 is a horizontal sectional view taken substantially on the line 4—4 of Fig. 2;

Fig. 5 is a longitudinal vertical sectional view taken substantially on the line 5—5 of Fig. 4;

Fig. 6 is an enlarged sectional view taken substantially on the line 6—6 of Fig. 4;

Fig. 7 is a vertical sectional view taken substantially on the line 7—7 of Fig. 6;

Fig. 8 is an enlarged horizontal sectional view taken substantially on the line 8—8 of Fig. 3;

Fig. 9 is a cross-sectional view taken substantially on the line 9—9 of Fig. 8; and Fig. 10 is a vertical sectional view taken substantially on the line 10—10 of Fig. 9.

As illustrated in the drawings, the preferred embodiment of the instrument of the invention comprises a main elongated tubular member or barrel 12 of uniform cross-sectional outline, which, as shown in Figs. 3 and 9, is partially circular and partially rectangular. An objective lens 13 is supported in a frame 14 having two leg portions 15 adapted to assist in maintaining the objective frame 14 in position in the tubular member 12.

The forward ocular lens, the forward total reflecting prism, and the focusing mechanism are preferably mounted in a detachable box-like housing 16 having top wall 17, bottom wall 18, forward wall 19, and rear wall 20. Tubular member 12 and the box-like housing 16 just described are preferably formed of a light durable metal such as aluminum, although it will be understood that equivalent material may be employed if desired. An intermediate wall portion 21 extends transversely within the housing 16 to provide a support for the forward integral total reflecting prism 22 having reflecting surfaces 23 and 24. Felt or similar cushioning material 25 may be interposed between prism 22 and the adjacent walls 19 and 21. As shown in Fig. 8, wall 21 extends between a longitudinal wall 26 and ocular tube 27, within which is slidably mounted the ocular member 28 comprising lenses 29 and 30. The housing 16 is preferably frictionally maintained in position, and is adapted to extend through a slot provided in the side of the tubular member 12, the latter having laterally extending flanges 31 and 32 engageable by offset ear portions 33 and 34, provided on the walls 17 and 18. Similarly, forward wall 19 is provided with a projection 35 which engages the outer surface of one side of the tubular member 12, and wall 20 is provided with a similar projection 36 which engages the opposite side of the tubular member 12. By this construction and arrangement, the entire housing 16 may be conveniently inserted or withdrawn and maintained in position by frictional contact of the parts. Also, the objective lens frame 14 having the leg portions 15, is frictionally maintained in position by contact with the adjacent wall 18 of the housing 16, and, as shown in Fig. 10, objective lens 13 is preferably disposed a slight distance to the rear of the forward extremity of tubular member 12.

The focusing mechanism is preferably mounted within an inner casing disposed within the housing 16 and having upper and lower walls 37 and 38, respectively, upon which are mounted inwardly extending guides 39 and 40. Guides 39 and 40 extend within coresponding slots in a longitudinal slidably rack block 41 which is provided with rack teeth 42. Operating shaft 43 is mounted for rotational movement in aligned openings in the walls 17, 18, 37, and 38, and has mounted thereon an operating knob 44 exteriorly of the housing 16, and also carries a pinion 45 adapted to mesh with the rack teeth 42.

Pivot member 46 is pivotally mounted upon block 41 by means of threaded pin 47 and has secured thereto a relatively short rod 48, the free end of which is provided with right-hand threads for threaded engagement in one end of turn buckle sleeve 49. The opposite end of sleeve 49 is provided with internal threads for engagement with the left-hand threads upon the forward end of rod 50 which, as shown, extends longitudinally rearwardly adjacent one corner of the tubular member 12 and is secured to bracket 51. Bracket 51 is preferably formed integrally with a frame member 52 which is slidably mounted within the tubular member 12 adjacent the rear extremity thereof, and is rectangular in general cross-sectional outline having open forward and rear portions. A rear total reflecting prism 53 is mounted within the frame 52 and is preferably maintained in position by a plurality of inwardly extending lugs 54 on the frame 52 which contact with the marginal portion of the face of the prism, and by a leaf spring 55, one end 56 of which extends through a slot in a wall of the frame 52, and the opposite end of which is provided with an opening 57 for engagement by hook member 58 on the opposite wall of the frame 52. Prism 53 has reflecting surfaces 59 and 60, and the apex of the prism is adapted to bear against spring 55 as shown in Fig. 6. By this manner of mounting the prism 53 is maintained in proper vertical position relative to the remainder of the instrument, but is readily removable for cleaning or such adjustment as may be necessary.

Mounted upon the rearmost extremity of tubular member 12 is a frictional and protective member 61, which may be composed of rubber, leather or similar material, and is preferably held in place by screws 62 which extend through member 12 into a wooden block 63. In case it is desired, the instrument may be conveniently suspended in a permanent place for ready use, such as on board a steamship, for example, by the provision of an adjustable strap 64 secured to bracket 65, and provided with a ring 66 for engagement by hook 67 secured to a wall 68.

In use, a ray of light passing through the objective lens 13 travels rearwardly in member 12 and is then reflected by reflecting surfaces 60 and 59 of total reflecting prism 53, in a return direction for reflection by surfaces 23 and 24 of total reflecting prism 20 through the ocular 28. When feasible, the instrument is preferably pressed lightly against a wall or other rigid structure, as shown in Fig. 1 for example, which serves to steady the instrument and avoid vibration. The frictional element 61, when composed of rubber, for example, serves to maintain the rear end of the instrument in elevated position with a slight amount of pressure, or in lieu thereof, the strap 64, adjusted for the proper height, may be conveniently employed. By reason of the fact that the objective and ocular lenses are both positioned in the forward portion of the instrument, and adjacent each other, it will be seen that such slight vibration as occurs will correspond to the line of vision, and the instrument is naturally moved in accordance with the angular change in the line of vision. This presents a material advantage over the tripod type wherein movement of the ocular lens is in a direction opposite to that of the objective. The focus adjustment is made by rotation of the knob 44, conveniently located adjacent the ocular, and by reason of the rack and pinion connection with the rear double reflecting prism, the latter may be selectively positioned for the desired adjustment of focus. By reason of the fact that the rear total reflecting prism is shifted for focusing purposes, a given change of position produces twice the change in focal length than where focusing is done by either the ocular or objective. In my experience in using the instrument, under all sorts of conditions and circumstances, I find the shoulder very handy to use as a support under many conditions.

A representative instrument of the character described may be made with a focal length of 50 inches which, with a one-half inch ocular, for example, will magnify one hundred times. Although a typical instrument may have this high power of magnification, the structure is light in weight and convenient to manipulate.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A prism telescope comprising a main tubular member arranged to extend a substantial distance rearwardly of the head of the user, an ocular lens mounted adjacent the forward end of said tubular member, a total reflecting prism mounted adjacent said ocular lens, an objective lens mounted within said tubular member at a point adjacent said total reflecting prism, a second total reflecting prism mounted within said tubular member adjacent the opposite end thereof, and a frictional member mounted upon said last mentioned end of said tubular member for supporting said telescope against a rigid object to overcome vibration.

2. A prism telescope comprising a main tubular member arranged to extend a substantial distance rearwardly of the head of the user, an ocular lens mounted adjacent said tubular member, a total reflecting prism mounted within said tubular member adjacent one end thereof, an objective lens mounted within said tubular member adjacent the opposite end thereof, a second total reflecting prism interposed between said first mentioned total reflecting prism and said ocular lens, and a frictional member mounted upon the rearward end of said tubular member for supporting said telescope against a rigid object to overcome vibration.

3. A prism telescope comprising a main tubular member arranged to extend a substantial distance rearwardly of the head of the user, an ocular lens mounted adjacent said tubular member, a total reflecting prism mounted within said tubular member adjacent one end thereof, an objective lens mounted within said tubular member adjacent the opposite end thereof, a second total reflecting prism interposed between said first mentioned total reflecting prism and said ocular lens, manually operable means mounted adjacent said ocular lens and operatively connected to said first mentioned total reflecting prism for focusing adjustment, and a frictional member mounted upon the rearward end of said tubular member for supporting said telescope against a rigid object to overcome vibration.

4. A prism telescope comprising a main tubular member arranged to extend a substantial distance rearwardly of the head of the user, an ocular lens mounted adjacent said tubular member, an objective lens mounted within said tubular member, a total reflecting prism slidably mounted within said tubular member, a second total reflecting prism adapted to reflect rays of light from said first mentioned prism to said ocular lens, means for selectively positioning said slidably mounted prism for focusing purposes, and a frictional member mounted upon the rearward end of said tubular member for supporting said telescope against a rigid object to overcome vibration.

5. A prism telescope comprising a main tubular member arranged to extend a substantial distance rearwardly of the head of the user, an ocular lens mounted adjacent said tubular member, an objective lens mounted within said tubular member, a prism frame slidably mounted within said tubular member, a total reflecting prism positioned in said frame, a second total reflecting prism adapted to reflect rays of light from said first mentioned prism to said ocular lens, manually operable means adjacent said ocular lens operatively connected to said frame for selectively positioning the same for focusing purposes, and a frictional member mounted upon the rearward end of said tubular member for supporting said telescope against a rigid object to overcome vibration.

6. In a prism telescope of the character described, a single main tubular member having an optical system wherein light rays are carried rearwardly and thence forwardly, said system including an objective lens and a correlated reflecting prism; and a detachably mounted housing at the forward end of said tubular member having an ocular lens, a reflecting prism adapted to receive rays from the first said prism and reflect the same to said ocular lens, and focusing mechanism mounted therein.

7. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, a housing detachably connected to the forward portion of said tubular member, a second total reflecting prism mounted in said housing, an ocular lens mounted in said housing, manually operable focusing mechanism mounted in said housing, and an operative connection between said focusing mechanism and said prism holding frame.

8. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, a housing detachably connected to the forward portion of said tubular member, a second total reflecting prism mounted in said housing, an ocular lens mounted in said housing, manually operable focusing mechanism mounted in said housing, an operative connection between said focusing mechanism and said prism holding frame, and a frictional member mounted upon the rearward extremity of said tubular member for supporting said telescope against a rigid object to overcome vibration.

9. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, said tubular member provided with a housing receiving slot, a housing arranged to extend within said slot and to be frictionally maintained in position adjacent the forward extremity of said tubular member, a second total reflecting prism mounted in said housing, an ocular lens mounted in said housing, manually operable focusing mechanism mounted in said housing, and an operative connection between said focusing mechanism and said prism holding frame.

10. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, said tubular member provided with a housing receiving slot, a housing arranged to extend within said slot and to be frictionally maintained in position adjacent the forward extremity of said tubular member, a second total reflecting prism mounted in said housing, an ocular lens mounted in said housing, manually operable focusing mechanism mounted in said housing, an operative connection between said focusing mechanism and said prism holding frame, and a frictional member mounted upon the rearward extremity of said tubular member for supporting said telescope against a rigid object to overcome vibration.

11. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, a housing detachably connected to the forward portion of said tubular member, a second total reflecting prism mounted in said housing, an ocular lens mounted in said housing, a rack block slidably mounted in said housing, manually operable means for selectively positioning said rack block, and a rod connecting said rack block and said prism holding frame whereby the latter may be selectively positioned for focusing purposes.

12. A prism telescope comprising a main elongated tubular member arranged to extend a substantial distance rearwardly of the head of the user, an objective frame mounted adjacent the forward extremity of said tubular member, an objective lens mounted in said objective frame, a prism holding frame slidably mounted within the rearward portion of said tubular member, a total reflecting prism positioned in said prism holding frame, a housing detachably connected to the forward portion of said tubular member, a second total reflecting prism mounted in said housing, an ocular lens mounted in said housing, a rack block slidably mounted in said housing, manually operable means for seelctively positioning said rack block, a rod connecting said rack block and said prism holding frame whereby the latter may be selectively positioned for focusing purposes, and a frictional member mounted upon the rearward extremity of said tubular member for supporting said telescope against a rigid object to overcome vibration.

In testimony whereof I have signed my name to this specification.

HARVEY S. COVER.